(No Model.) 3 Sheets—Sheet 1.

L. WANNER, Jr. & R. T. WEAVER.
FILTER.

No. 590,868. Patented Sept. 28, 1897.

Witnesses:
Murray C. Boyer
Wm. A. Barr

Inventors:
Louis Wanner Jr. & Rob't T. Weaver
by their Attorneys,
Howson & Howson (No Model.) 3 Sheets—Sheet 2.

L. WANNER, Jr. & R. T. WEAVER.
FILTER.

No. 590,868. Patented Sept. 28, 1897.

Witnesses:

Inventors:
Louis Wanner Jr. & Robt. T. Weaver
by their Attorneys,
Howson & Howson (No Model.) 3 Sheets—Sheet 3.

L. WANNER, Jr. & R. T. WEAVER.
FILTER.

No. 590,868. Patented Sept. 28, 1897.

Witnesses:
Murray C. Boyer
Will. A. Barr.

Inventors:
Louis Wanner Jr. & Robt. T. Weaver
by their Attorneys,
Howson & Howson

UNITED STATES PATENT OFFICE.

LOUIS WANNER, JR., AND ROBERT T. WEAVER, OF PHILADELPHIA, PENNSYLVANIA.

FILTER.

SPECIFICATION forming part of Letters Patent No. 590,868, dated September 28, 1897.

Application filed November 20, 1896. Serial No. 612,886. (No model.)

*To all whom it may concern:*

Be it known that we, LOUIS WANNER, Jr., and ROBERT T. WEAVER, citizens of the United States, and residents of Philadelphia, Pennsylvania, have invented certain Improvements in Filters, of which the following is a specification.

The object of our invention is to construct a water-filter in sections, so that each section can be cleansed independently of the others.

A further object of the invention relates to the peculiar construction by which the filter can be readily put together.

Figure 1:
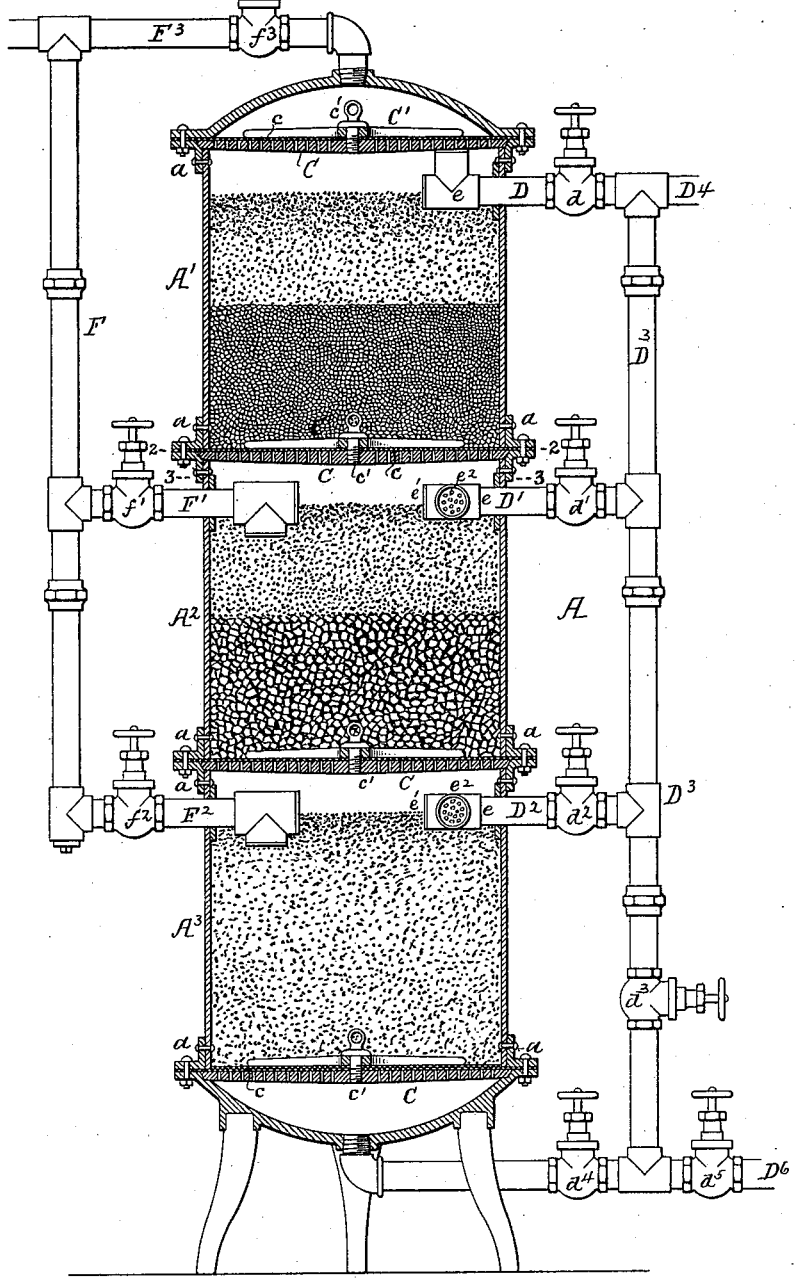
Figure 2:
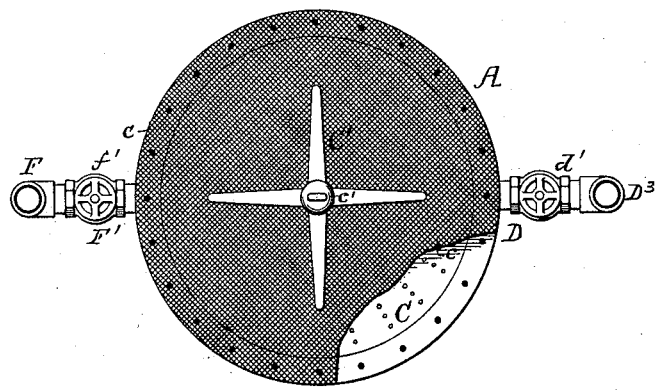
Figure 3:
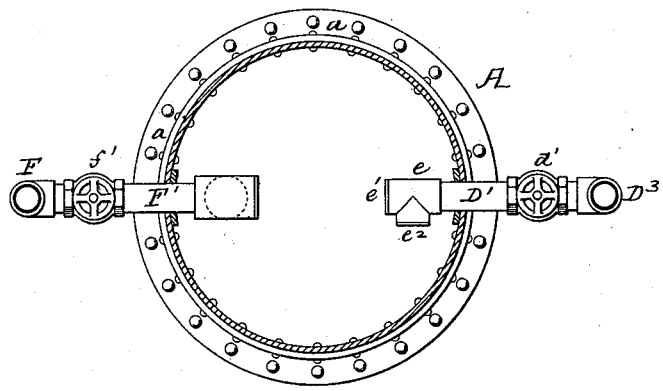
Figure 4:
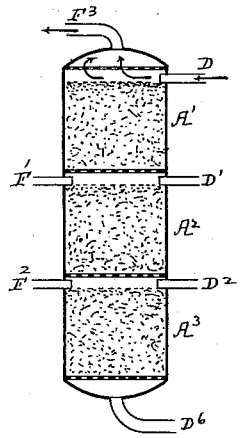
Figure 5:
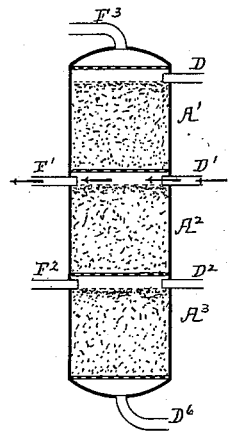
Figure 6:
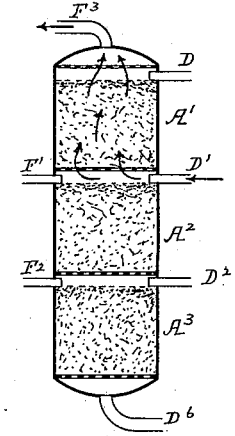
Figure 7:
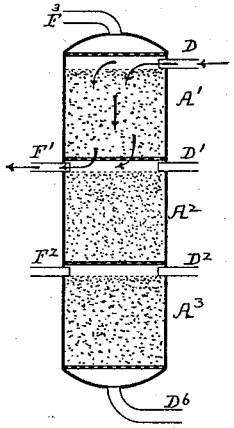

In the accompanying drawings, Figure 1 is a vertical sectional view of our improved filter. Fig. 2 is a section on the line 2 2, Fig. 1. Fig. 3 is a section on the line 3 3, Fig. 1; and Figs. 4 to 13, inclusive, are diagram views.

A is the casing of the filter, made up in the present instance of three sections $A'$ $A^2$ $A^3$. These sections are in the present instance sheet-metal cylinders having angle-flanges $a$ at both ends. These angle-flanges are bolted together, as clearly shown in Fig. 1. The upper portion of each section is recessed, and the upper angle-flange is beveled at the corner, so as to receive the perforated plate C, which supports the wire-gauze $c$. This wire-gauze extends beyond the plate and between the flanges of the sections, and the edge of the gauze is filled, preferably, with lead, so that it will form a gasket when the sections are coupled together.

On top of the wire-gauze is a spider $C'$, having, in the present instance, four arms which tend to hold the gauze down onto the perforated plate, preventing it from buckling. This spider is held in position by a bolt $c'$, which passes through the gauze and is screwed into the perforated plate.

The perforated plates and screens are situated at the top and bottom of the filter as well as between the sections, as shown in the drawings, and directly under each perforated plate, with the exception of the lower one, are inlet-pipes D $D'$ $D^2$, coupled to the main $D^3$, which in turn is coupled to the supply-pipe $D^4$. The pipe $D^3$ extends to the outlet-pipe $D^6$, which enters the bottom of the reservoir, and on each side of the pipe $D^3$ are valves $d^4$ $d^5$ for controlling the flow of water through the outlet-pipe, and in the pipe $D^3$ is a valve $d^3$, and the sections D $D'$ $D^2$ are provided with valves $d$, $d'$, and $d^2$, respectively.

At each end of each section in the inside of the filter is a T-head $e$, having perforated plates $e'$ $e^2$, so as to prevent the filtering material entering the pipes. The upper pipe D of the series is the distributer, and its T preferably extends up to the under side of the upper perforated plate. The other openings are wash-out openings for cleansing the filtering material of the section above. By having a nozzle in the form of a T-head with two openings we form two currents of water on the surface of the filtering material, so as to thoroughly cleanse the surface and keep it from being clogged.

On the opposite side of the filter in the present instance is a clean-out pipe F, having sections $F'$ $F^2$ extending into the upper part of the lower and intermediate chambers, and the pipe F has also an extension $F^3$, which enters the top of the reservoir. The extensions are provided with valves $f'$, $f^2$, and $f^3$, respectively, to regulate the flow of waste water from the filter.

The heads of the outlet-pipes are T-shaped and slightly larger than the inlet-pipes and have perforated plates to prevent the escape of filtering material, but do not interfere with the free escape of dirt and other foreign matter.

The filtering material is preferably arranged as shown in the drawings, and each section is filled at the point indicated. In one half of the upper section there is grit and in the lower half slag. In the second section there is fine bone-black and pine-wood charcoal, and in the lower section there is medium-grade bone-black.

It will be understood that the filtering material may be varied according to the conditions and the chemical analysis of the water to be filtered.

To filter water, all the valves, with the exception of the valves $d$, $d^4$, and $d^5$, are closed. The water will then pass into the upper section of the filter through the pipe D, down through the several sections, and will be discharged through the outlet-pipe $D^6$. The nozzle of the inlet-pipe D having the two openings, the water is separated and passed over the filter-bed of grits, cutting out from the water all suspended matter. Then the water percolates down through the grits and slag, the slag being in the lower half of the section, where all iron oxids are removed. The water then passes through one of the dividing screens and plates and then through the central section, having fine bone-black, which removes more of the finer particles, then through the pure wood charcoal, which will remove all color caused by vegetable decay. The water then passes through another screen into the lower section, which is entirely filled with bone-black and which will remove all organic matter in solution. The water will then pass through the last screen and perforated plate. This screen is double in the present instance, and one of the screens is of a very fine mesh. The water passes from the reservoir out the discharge-pipe to the service-pipe.

To clean the filter, open the valve $f^3$ in the pipe $F^3$. This pipe $F^3$ is of the same area as the inlet-pipe, so that there is no resistance whatever over filter-bed. The accumulated filth will be carried up by pressure through the plate and discharged through the clean-out pipe, as in Fig. 4. This removes the accumulated filth from the top of the filter, and this method of cleansing is used at frequent intervals, so as not to agitate the entire mass of filtering material, which will soon be destroyed by constant agitation. If the second section is to be cleansed independently of the other sections, close the valves $d$ and $f^3$, open the valve $d'$ and valve $f'$, Fig. 5, and the water will cleanse the surface of the filtering material of the second section. The valve $f'$ is then closed and the valve $f^3$ opened, Fig. 6. The water will pass up through the upper section and out the discharge-pipe $F^3$, thoroughly cleaning the upper section without disturbing the lower section, excepting to remove any filth that will collect above the filtering material of the second section. The upper section can be rinsed, if necessary, by opening the valve $d$ and valve $f'$ and closing the valves $d'$ and $f^3$, Fig. 7.

Figure 8:
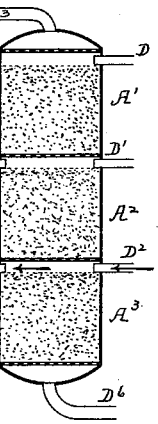
Figure 9:
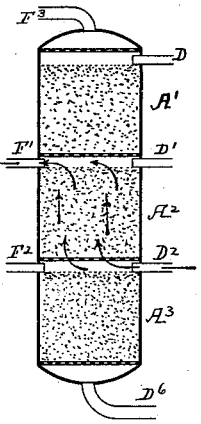
Figure 10:
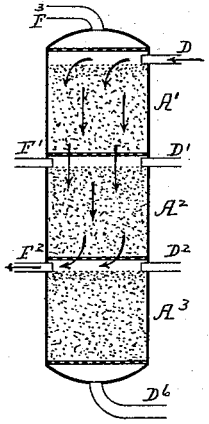

When it is desired to clean the center section, the valves are all closed excepting valves $d^2$ and $f^2$, Fig. 8, the action being similar to that described in connection with the other section—namely, that the accumulated filth will be first removed from the surface of the filtering material of the lower section. Then the valve $f^2$ will be closed and the valve $f'$ opened, Fig. 9, and the water will pass up through the center section and out the discharge-pipe $F'$. The second section can be rinsed with filtered water by opening the valves $d$ and $f^2$ and closing valves $d^2$ and $f'$, Fig. 10.

Figure 11:
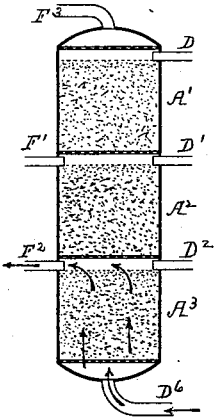
Figure 12:
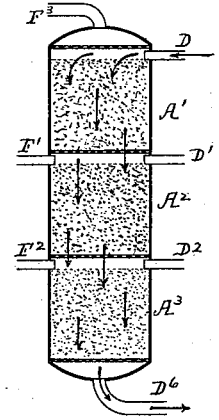
Figure 13:
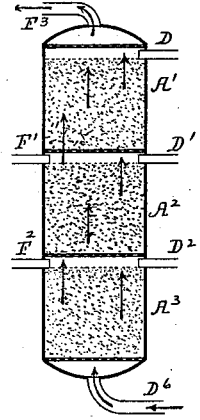

If the lower section is to be cleaned, the valves $d^4$ and $d^5$ and valve $f^2$ are opened and all other valves closed, so that the water will enter the bottom of the filter, pass up through the material in the bottom section $A^3$, and out the discharge-pipe $F^2$, as in Fig. 11. If it is desired to rinse the lower section with filtered water, then the valves $d$, $d^4$, and $d^5$ are opened and all other valves closed, the same as in filtering, and the water will flow, as indicated in Fig. 12, to waste until the water is clear. The current can then be reversed if necessary to cleanse the material, as indicated in Fig. 13.

It will be seen by the above description that for ordinary purposes the filth can be removed from the top of any one or all of the sections without having to force it through a body of filtering material, and in the case of the filtering material being charged with foreign matter this can be removed by cutting out any one of the sections and cleansing one section at a time by a reverse current.

If one of the filtering-sections should be clogged up and it is wished to continue the filtering of water, the valves may be so manipulated that the water will pass around the clogged filtering-bed and out the discharge-pipe $D^6$, the water being filtered by one or two beds only.

We claim as our invention—

1. The combination of a filter made up of a series of sections, each section separated from the other by a perforated plate, filtering material within each section, a valved inlet for each section and a valved outlet at the top of each section, a discharge-pipe at the bottom of the filter, the filter being so arranged that the surface of the filtering material in either section can be cleansed without disturbing the filtering material and any one of the sections can be cleansed without disturbing the other sections, substantially as described.

2. The combination in a water-filter, of the sections $A'$, $A^2$, $A^3$, a perforated plate and a gauze plate separating the sections, the said gauze plate being clamped between the sections forming a packing, a vertical pipe $D^3$, branches D, $D'$, $D^2$ extending from the pipe into the upper portion of the several sections, valves in the several branches, a pipe F having branches $F'$, $F^2$ extending into the upper portions of the chambers $A^2$, $A^3$, valves in said branches, a branch $F^3$ communicating with the top of the filter and a pipe communicating with the bottom of the filter, substantially as and for the purpose set forth.

3. The combination in a water-filter, made up of sections, one or more of the sections having filtering material mounted on perforated plates leaving a space between the filtering material of one section and the perforated plate above it, an inlet-pipe on a line with the filtering material in said section and an outlet-pipe also on a line with the filtering material so that when the valves of the two pipes are opened the water will pass through the upper portion of the filtering-chamber over the surface of filtering material and escape through the outlet-pipe without disturbing the main body of the filtering material, substantially as described.

4. The combination of a water-filter made up of sections, perforated plates separating the sections and supporting the filtering material of each section, a limited amount of filtering material in each section so as to form a space between the filtering material and the perforated plate above it, an inlet-pipe having an opening at one side, an outlet-pipe on the opposite side of the filter so that when the two pipes are open the water will enter the filter through the side opening and circulate over the surface of the filtering material and remove any sediment therefrom and carry it to the waste-pipe, substantially as described.

5. The combination in a sectional water-filter, of the series of sections mounted one above the other each section having a body, flanges at top and bottom, means for securing the flanges together, wire-gauze mounted between the said sections and forming the gaskets therefor, perforated plates supporting the said wire-gauze, filtering material in each section, perforated plates and wire-gauze at the top and bottom of the filter, an inlet-pipe communicating with the top of each section and with the bottom of the filter, valves in said pipe, an outlet-pipe for filtered water communicating with the bottom of said pipe, a valve for said outlet-pipe, a waste-pipe communicating with the top of the several sections and a valve for the said pipe so that the water will percolate through the entire series of filtering material whereby any one of the sections can be cleansed, substantially as described.

In testimony whereof we have signed our names to this specification in the presence of two subscribing witnesses.

LOUIS WANNER, JR.
    ROBERT T. WEAVER.

Witnesses:
 WILL. A. BARR,
 JOS. H. KLEIN.